US005958177A

United States Patent [19]
Claussnitzer

[11] Patent Number: 5,958,177

[45] Date of Patent: Sep. 28, 1999

[54] LABELLING DEVICE

[76] Inventor: Werner Claussnitzer, Boeddinghausstrasse 2, D-42329 Wuppertal, Germany

[21] Appl. No.: 09/054,441

[22] Filed: Apr. 3, 1998

[30] Foreign Application Priority Data

| | | | |
|---|---|---|---|
| Sep. 16, 1997 | [DE] | Germany | 297 16 596 U |
| Nov. 26, 1997 | [DE] | Germany | 297 20 879 U |

[51] Int. Cl.[6] ...... B32B 31/00

[52] U.S. Cl. ...... 156/391; 156/556; 156/579; 156/580

[58] Field of Search ...... 156/556, 579, 156/514, 538, 391, 580

[56] References Cited

U.S. PATENT DOCUMENTS

| | | |
|---|---|---|
| 1,500,698 | 7/1924 | Wiehl . |
| 1,821,916 | 9/1931 | Acheson et al. . |
| 1,843,140 | 2/1932 | Mills . |
| 2,302,503 | 11/1942 | Proctor . |
| 3,071,381 | 1/1963 | Schneider . |
| 3,165,320 | 1/1965 | Ryan . |
| 3,165,321 | 1/1965 | Osborne et al. . |
| 3,193,295 | 7/1965 | Isemura . |
| 3,223,442 | 12/1965 | Fawdry et al. . |
| 3,436,082 | 4/1969 | Bostrom et al. . |
| 3,509,992 | 5/1970 | David et al. . |
| 3,561,768 | 2/1971 | Castagna . |
| 3,570,661 | 3/1971 | Kersh . |
| 3,687,769 | 8/1972 | Dague . |
| 3,768,815 | 10/1973 | Mathurin . |
| 3,770,908 | 11/1973 | Craggs . |
| 3,871,663 | 3/1975 | Stave . |

(List continued on next page.)

FOREIGN PATENT DOCUMENTS

| | | |
|---|---|---|
| 0 026 475 A1 | 9/1980 | European Pat. Off. . |
| 0 418 608 A1 | 8/1990 | European Pat. Off. . |
| 0 422 774 A2 | 9/1990 | European Pat. Off. . |
| 0 553 034 A2 | 1/1993 | European Pat. Off. . |
| 2 634 931 | 7/1988 | France . |
| 2 009 816 | 3/1970 | Germany . |
| 2 155 804 | 11/1971 | Germany . |
| 296 10 120 U1 | 6/1996 | Germany . |
| 296 17 424 U | 10/1996 | Germany . |
| 2-127230 | 5/1990 | Japan . |
| 5-325495 | 10/1993 | Japan . |
| 9604048 | 2/1996 | United Kingdom . |
| 2 170 910 | 8/1996 | United Kingdom . |
| WO 94/13446 | 12/1993 | WIPO . |
| WO 96/05057 A1 | 8/1995 | WIPO . |
| WO 97/30900 | 2/1997 | WIPO . |

*Primary Examiner*—James Engel
*Attorney, Agent, or Firm*—Hill & Simpson

[57] ABSTRACT

A device for applying a label to a compact disk is provided. The device includes a base plate that has a central opening through which a label projection member extends. The diameter of the label projection member is slightly smaller than the diameter of the central opening for the label of the compact disk thereby enabling the label to be placed on the base plate and over the label projection member with the adhesive side facing upwards. The device also includes a press-cover which includes a guiding projection member which frictionally engages the central opening of the compact disk. The label projection member also includes a central recess for accommodating the guiding projection of the press-cover. The guiding projection member, with the compact disk mounted thereon, is inserted into the central recess of the label projection member and the press-cover, compact disk and label projection member are pressed downward until the compact disk engages the adhesive side of the label. The label projection member is spring biased towards an upper position where the top surface is disposed above the base plate but can be moved under a downward force imposed on the press-cover to a lower position where the top surface is disposed at or below the base plate thereby enabling the compact disk to engage the label.

44 Claims, 6 Drawing Sheets

U.S. PATENT DOCUMENTS

| | | | |
|---|---|---|---|
| 3,940,793 | 2/1976 | Bleiman . | |
| 4,085,178 | 4/1978 | McNeely et al. . | |
| 4,171,531 | 10/1979 | Grapes et al. . | |
| 4,213,927 | 7/1980 | Alberti . | |
| 4,313,718 | 2/1982 | Llabres et al. . | |
| 4,340,955 | 7/1982 | Elliot . | |
| 4,358,843 | 11/1982 | Rager . | |
| 4,385,460 | 5/1983 | Hanna . | |
| 4,408,318 | 10/1983 | Sugiura . | |
| 4,420,830 | 12/1983 | Green . | |
| 4,470,137 | 9/1984 | Tago . | |
| 4,499,516 | 2/1985 | Purdy et al. . | |
| 4,514,839 | 4/1985 | Eisemann . | |
| 4,549,922 | 10/1985 | Oishi et al. . | |
| 4,562,570 | 12/1985 | Denton . | |
| 4,660,119 | 4/1987 | Kato et al. . | |
| 4,687,536 | 8/1987 | Hiramatsu et al. | 156/556 |
| 4,710,913 | 12/1987 | Matsushima et al. . | |
| 4,730,300 | 3/1988 | Kamoshita et al. . | |
| 4,871,404 | 10/1989 | Murata et al. . | |
| 4,879,437 | 11/1989 | Dard et al. . | |
| 4,903,255 | 2/1990 | Sugaya et al. . | |
| 4,971,648 | 11/1990 | Doering . | |
| 4,983,437 | 1/1991 | Merrick . | |
| 5,084,127 | 1/1992 | Nakamura . | |
| 5,316,464 | 5/1994 | Lexell . | |
| 5,346,654 | 9/1994 | Kodaka et al. . | |
| 5,412,541 | 5/1995 | Tanaka . | |
| 5,417,457 | 5/1995 | Reinhardt . | |
| 5,421,950 | 6/1995 | Parrish . | |
| 5,543,001 | 8/1996 | Casillo et al. . | |

Fig. 5
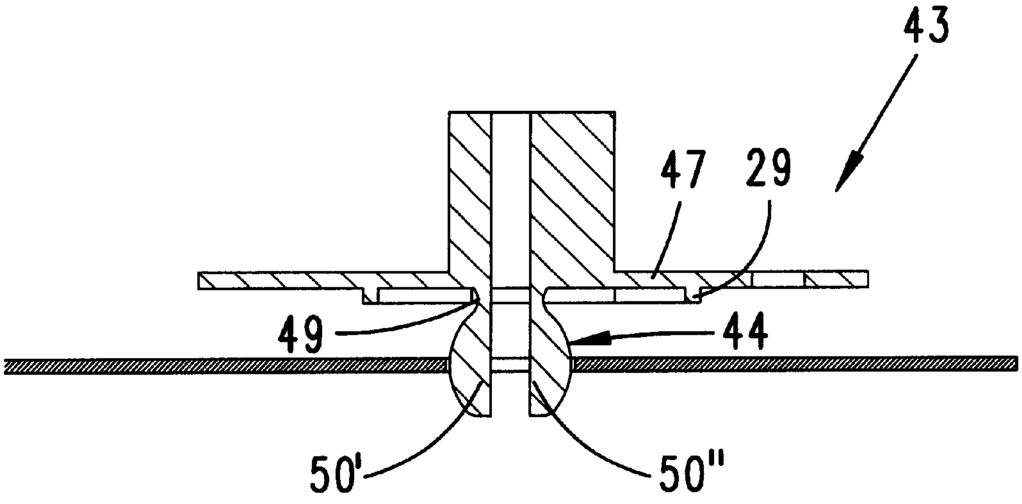
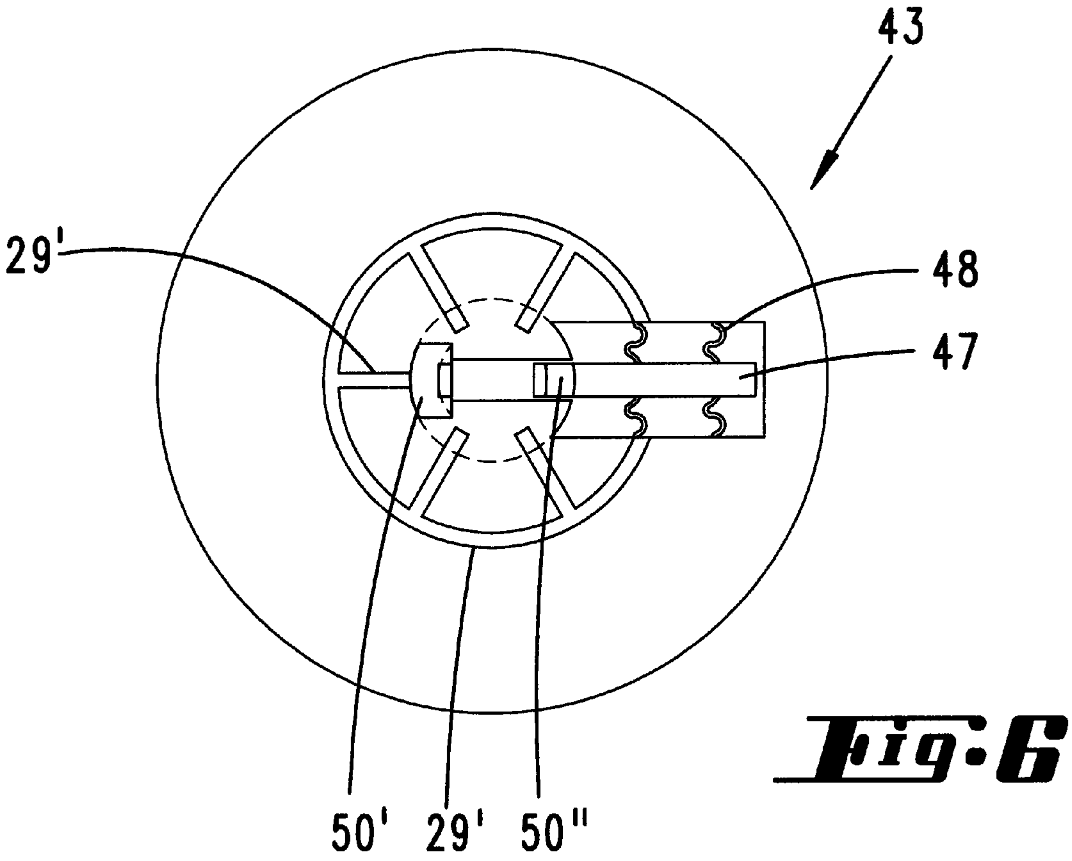
Fig. 6

L
13
52
52''
a
b
1
3a
3
4
54
51
51'
60
59
57
58
53
52'
8
56
56a
61
2

62
62'
52'

43
52
c
b
a
X
8
54
2
3a
3
65
64a
63
58
64
61

LABELLING DEVICE

FIELD OF THE INVENTION

The invention relates to devices for labelling a compact disk. More specifically, the invention relates to devices for labelling compact disks that include a base for accepting the label and a press-cover for pressing the CD onto the label.

BACKGROUND OF THE INVENTION

The registered documents of the reference DE-GM 296 17 642 discloses a device for applying labels to compact disks (CDs). This device usually delivers good results and is easy to handle.

However, the CD must first be placed on the device by hand; then the press-cover must be pressed at the CD from above, and a combined pressing down must ensue. After the end of the process, the CD has to be removed from the device again by hand.

The invention is concerned with the technical problem of providing a device that is easier to use and that applies labels to CDs in a more reliable manner.

BRIEF SUMMARY OF THE INVENTION

This problem is primarily and essentially solved in a device with a press-cover that comprises a holding means for holding the CD on the press-cover. Based on this holding means, it is possible to place the CD on the press-cover and then to press with the press-cover on the rest of the device for a labelling process. After the end of the labelling process, the CD can be removed again from the remaining device together with the press-cover without having to handle the CD. The placement and removal of the CD on the press-cover can be performed in a position technically favorable for handling. One need only to grasp the CD at the narrow edge and is guided only to do so. The unfavorable grasping of the CD at its entire surface is discouraged already by the construction of the device and its press-cover.

In an embodiment, the present invention provides a device for applying a label with a central opening to a compact disk, also having a central opening. The device includes a base plate which also has a central opening through which a label projection member extends. The label projection member has a top surface. The label projection member is biased towards an upper position where the top surface of the member is disposed above the base plate. The label projection member also has a lower position wherein the top surface is disposed at or below a coplanar position with the base plate. The label projection member extends through the central opening of the label when the label projection member is in the upper position thereby enabling the label to be placed on the base plate. The device further comprises a press-cover which comprises a guiding projection for frictionally engaging the central opening of the compact disk. The press-cover enables the user to press the compact disk onto the top surface of the label projection member and further to press the label projection member and the compact disk downwards so that the compact disk engages the label.

In an embodiment, the guiding projection comprises a downwardly directed cylindrical body.

In an embodiment, the guiding projection has a central axis directed downward from the press-cover. The guiding projection further comprises a plurality of wall sections which extend outwardly from a central axis.

In an embodiment, the guiding projection comprises a plurality of individual wall segments that extend downward from the press-cover.

In an embodiment, the wall segments of the guiding projection member are curved in an outward direction.

In an embodiment, the label projection comprises a cylindrical wall that extends downward from the top surface. The cylindrical wall comprises a protruding member. The base plate is connected to a tube that extends downward from the central opening of the base plate. The tube accommodates the label projection and further comprises a recess for accommodating the protruding member of the label projection.

In an embodiment, the protruding member of the label projection is a longitudinal rib and the recess of the tube is a slot. The accommodation of the rib and the slot prevents rotation of the label projection member within the tube.

In an embodiment, the press-cover comprises a cover plate. The cover plate comprises a radially extending slot with a press hold projection disposed therein. The press hold projection comprises a distal end which comprises a downwardly extending tab. The press hold projection is movable from a radially outward position to a radially inward position where the tab engages an outer periphery of the compact disk to secure the compact disk in place under the cover plate.

In an embodiment, the press hold projection is connected to an upwardly protruding actuation projection disposed at a center of the cover plate.

In an embodiment, the actuation projection comprises a handle.

In an embodiment, the label projection member further comprises a cylindrical body that extends downward from the top surface of the label projection. The cylindrical body comprises a central recess disposed in the top surface thereof for accommodating the guiding projection of the press-cover and which enables the press-cover and compact disk to be centered onto the top surface of the label projection member. The cylindrical body of the label projection member further comprises an underside that engages a spring. The spring is disposed between the underside of the cylindrical body and a footing. The footing is connected to a shaft that extends upward through an aperture disposed in the underside of the cylindrical body. The shaft extends through the aperture and into the central recess. A distal end of the shaft is disposed in the central recess and is characterized by a radial flange that has a diameter greater than the aperture in the underside of the cylindrical body. The radial flange thereby acts as a stop to prevent removal of the cylindrical body from the shaft.

Other objects and advantages of the invention will become apparent upon reading the following detailed description and appended claims, and upon reference to the accompanying drawings.

BRIEF DESCRIPTION OF SEVERAL VIEWS OF THE DRAWING

The invention is additionally explained using exemplifying embodiments depicted in the drawing. In the drawing:

FIG. 5 is a cross-sectional view of the press-cover and a CD during fixation of the CD on the press-cover;

FIG. 6 is a bottom view of the press-cover of the device shown in FIG. 3 and FIG. 4;

From the above description it is apparent that the objects of the present invention have been achieved. While only certain embodiments have been set forth, alternative embodiments and various modifications will be apparent from the above description to those skilled in the art. These and other alternatives are considered equivalents and within the spirit and scope of the present invention.

DETAILED DESCRIPTION OF THE INVENTION

Figure 7:
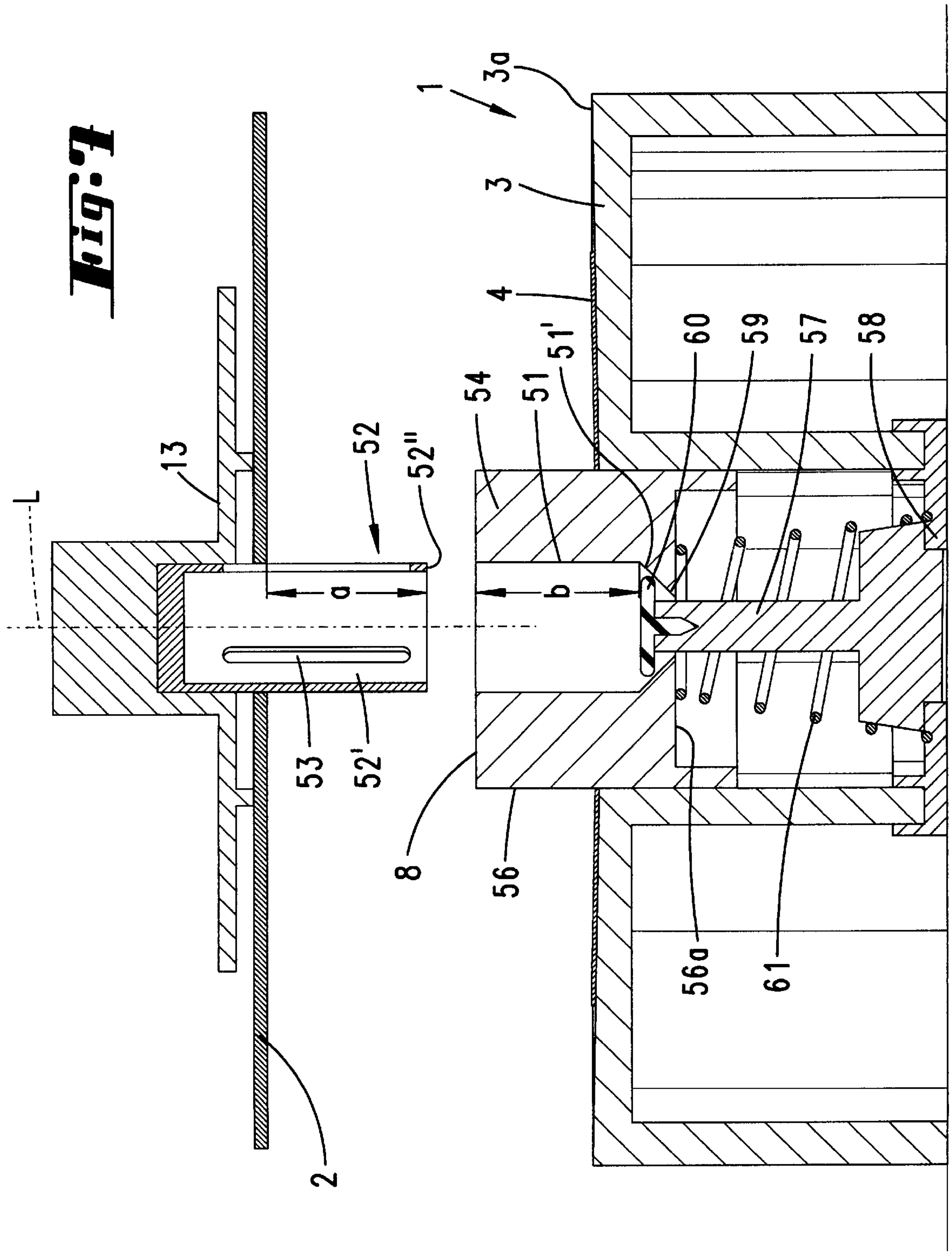
FIG. 7 is a cross-sectional view of another alternative device with a press-cover and CD secured thereon.

A device 1 for labelling a compact disk CD 2 is illustrated and described in FIG. 7. The device 1 comprises a base plate 3 with an upper surface 3*a* on which a label 4 is placed with the adhesive side up. The CD 2 is held on a press-cover 13. The device 1 further comprises a base plate 3 for accepting a label 4. The label 4 is accepted specifically at a label projection 54 projecting beyond the acceptor plate 3. The label projection 54 comprises a diameter fitted to the central opening of the label. A downwardly directed guiding projection 52 is configured at the press-cover 13 at the lower side to accommodate a central opening of the CD 2.

Figure 1:
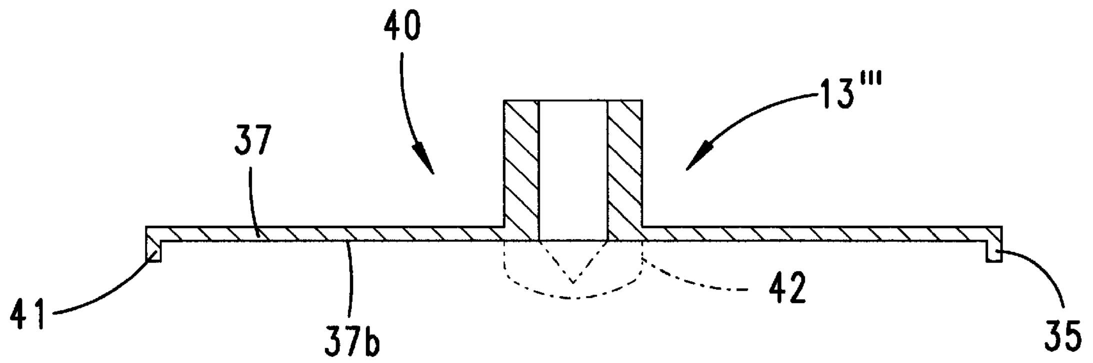
FIG. 1 is a cross-sectional view of a first embodiment of a press-cover of the labelling device of the invention.
Figure 2:
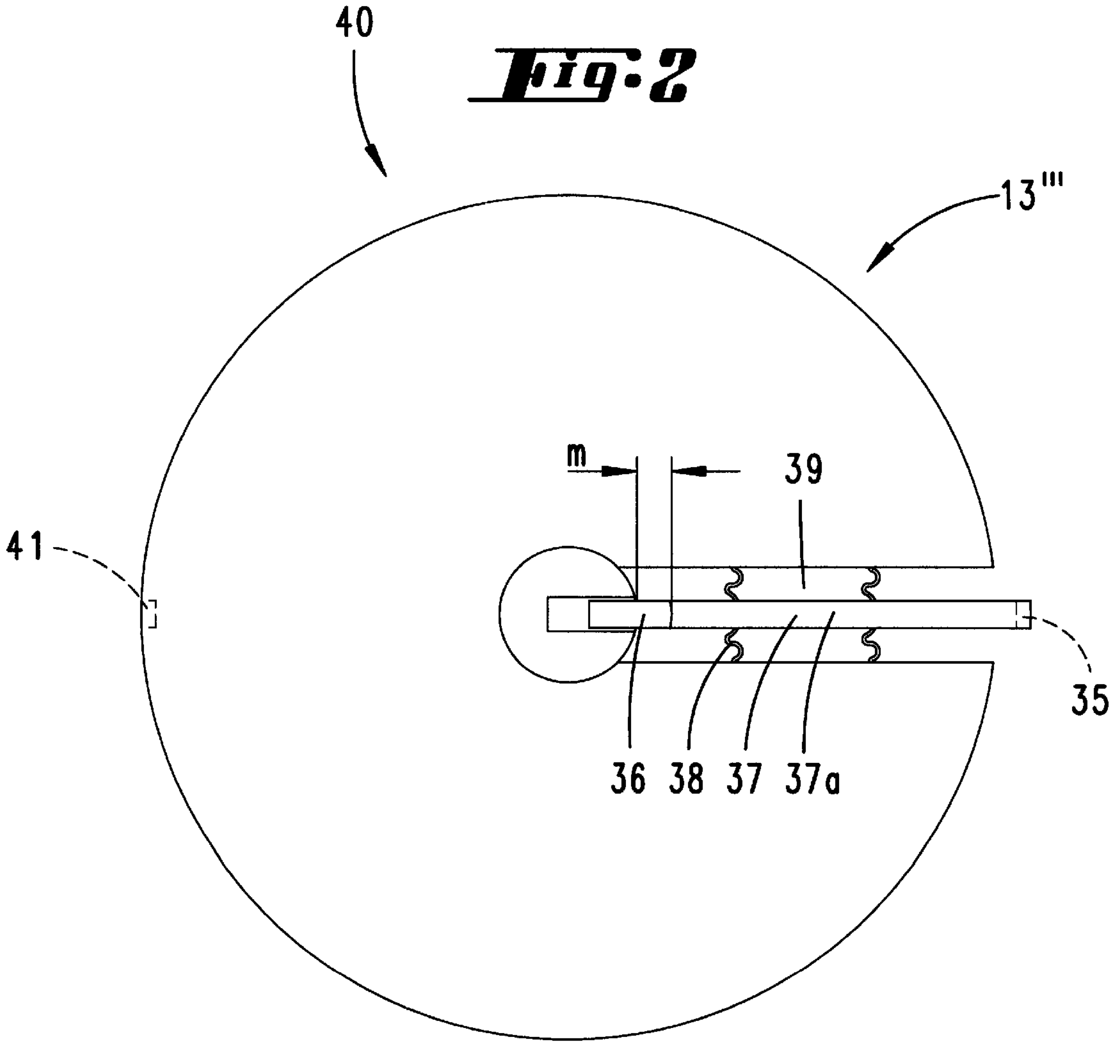
FIG. 2 is a plan view of the press-cover shown in FIG. 1.

Referring now to FIGS. 1 and 2, a press-cover 13 is depicted which is distinguished by a press-hold projection 35 which can be actuated. In this regard, as is evident in the plan view according to FIG. 2, the press-hold projection 35 is connected with an actuation projection 36; this connection being of one piece in the exemplifying embodiment. The actuation projection 36 extends vertically in an upward fashion relative to the cover body 37. The actuating projection is connected to the press-hold projection 35 via a connection arm 37*a*. The connection arm 37*a* is connected via connection springs 38 formed in one piece with the press-cover in a plastic extrusion process. A punch-out section 39 is formed in this region of the cover body 37. Only the connection springs 38 run through the punch-out section 39.

Furthermore, the connection springs 38 are so formed, such as to enable motion of the actuation projection 36 or respectively, of the press-hold projection 35 essentially only radially inward so that the tab 35 can engage the outer periphery 2*a* of the CD 2.

As is further evident, the actuation projection 36 is formed in the region of the holding journal 40. The actuation projection is formed in such a way that, when not actuated, it is not integrated in an outer perimeter of the actuation journal 40, but rather projects beyond this—radially—by the distance "m". If the CD 2 is now grasped, the pressing together of the actuation projection 36 with the holding journal 40 produces a clamping hold of the CD 2 during radially inward motion of the actuation projection 36 and thus of the press-hold projection 35 radially inward. In this regard, an opposing counter-catch 41 is formed which projects downwards beyond the cover plate 37 corresponding to the press-hold projection 35.

Additionally or alternatively, the counter-catch 41 can similarly be realized through a counter-hold-projection 42 projecting downwards beyond the bottom surface 37*b* of the cover 37. Of course, the counter-hold-projection 42 needs to be provided only with a thickness corresponding to the thickness of the CD.

Figure 3:
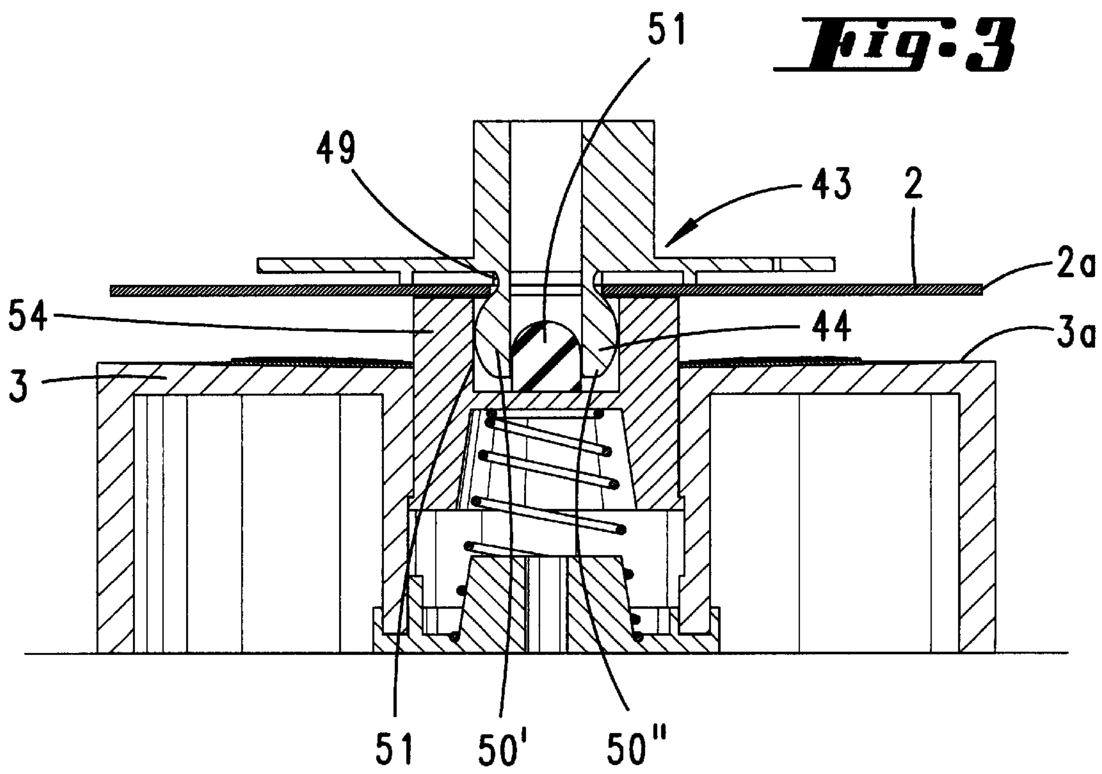
FIG. 3 is a cross-sectional view of an alternative embodiment of a press-cover as installed on a labelling device made in accordance with the invention.
Figure 4:
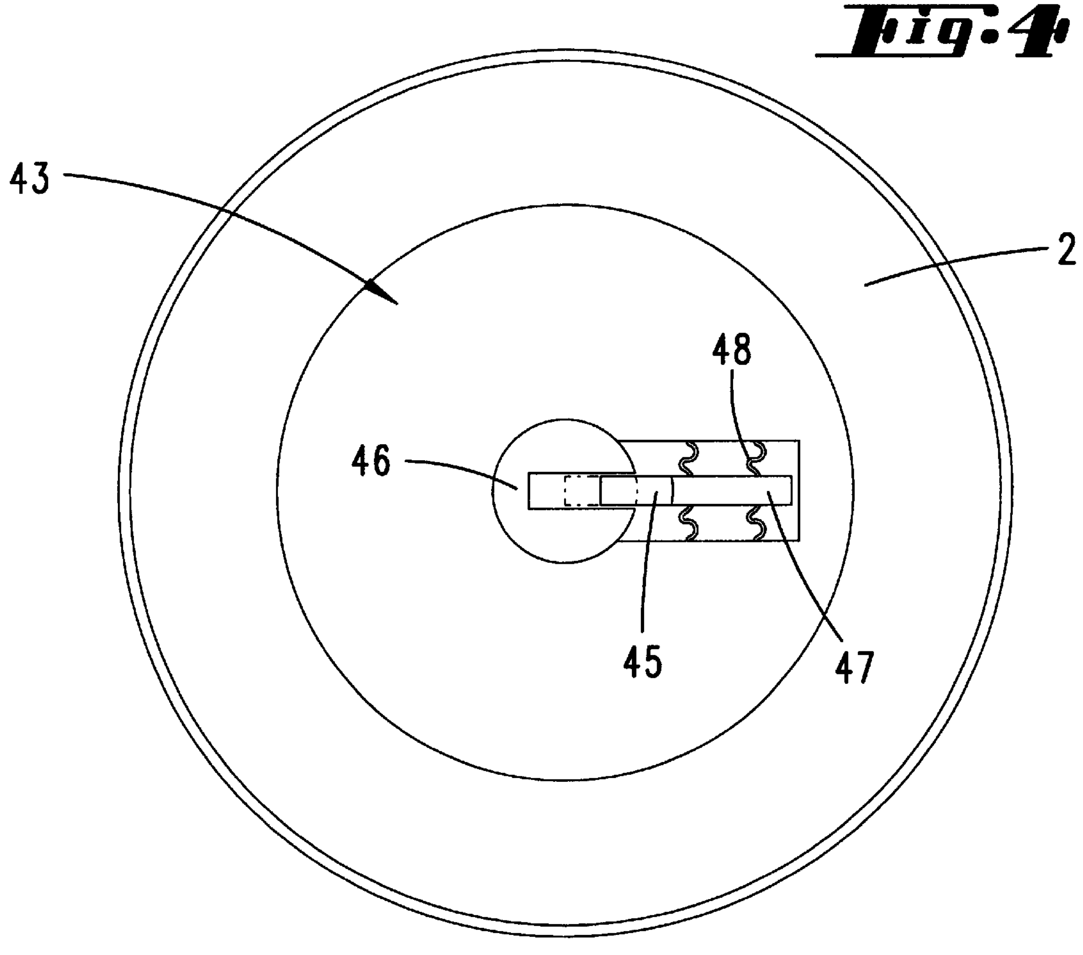
FIG. 4 is a plan view of the labelling device shown in FIG. 3.

In the device according to FIG. 3, another alternative press-cover 43 is provided with a lower snapping holder 44 which is integrally connected to the cover 43 and at the same time functions in the same manner as the guiding projection 52 of the embodiment shown in FIG. 7. As is also evident in the plan view of FIG. 4, what is essential is that the snapping holder 44 is oriented in its clamping position in the inactive state. In actuation, or respectively, placement of the CD 2 onto the press-cover 43, the grasping portion 45 projects beyond the press-cover 43 on the upper side must be moved toward a median line of the press-cover 43, or respectively, toward the stationary grasping portion 46. As is evident in the plan view of FIG. 4, and also in greater detail when viewed together with the bottom of the view in FIG. 6, the grasping portion 45 comprises an essentially horizontal extension 47 extending with the thickness of the press-cover 43. The extension 47 is connected to the press-cover 43 via integrally molded spring elements 48.

Specifically, as shown in FIGS. 3 and 5, the snapping holder 44 comprises a collar 49 fitted to an inner diameter of the CD 2 as well as clamping hold-cheeks 50', 50" projecting downwardly beyond this collar 49. In the exemplifying embodiment, the clamping hold-cheeks 50', 50" have convexly curved cross-sectional profile. The upper curvature produces a sliding effect in the direction toward the press-cover 43 after the widest portion of the curve has been passed by the CD 2. Given a relaxing of the clamping hold-cheeks 50', 50", this effect pushes the CD 2 further upwards. The lower curvature at the lower side serves to insert into the central recess 51 of the label, projection 54. As is evident, an outer diameter of the clamping hold-cheeks 50', 50" which is in the region of the largest diameter is larger than a free diameter of the CD 2.

Nor is it absolutely essential that the clamping hold-cheeks 50', 50" are guided into a recess 51 of the label projection 54. Rather, the guiding can also be obtained by a centralizing base 51' (see FIG. 7). The central recess 51 can also be larger than would correspond to the largest diameter of the clamping hold-cheeks 50', 50".

The embodiment in FIG. 5 depicts how a CD 2 is guided over the clamping hold-cheeks 50', 50" in order to reach a holding position according to FIG. 3. The view from below in FIG. 6 shows the press-cover 43 without a CD 2, i.e. in the relaxed position. While the one (free-standing) clamping hold-projection 50' can be configured with a larger width (a larger perimeter), the other clamping hold-projection (the mobile snapping projection) 50" can be configured with a smaller perimeter.

Though not of absolute necessity, pressure intensifier ribs 29 are provided in this embodiment at the lower side or underside of the press-cover 43. The contact between the CD 2 and the press-cover 43 is limited to the lower surface or the underside of the pressure intensifier ribs 29. Particularly, an external ring-shaped pressure intensifier rib 29 is formed which is designed with a radius toward a center axis of the press-cover 43 (or respectively, a central axis of the recess of the CD 2). The radius approximately corresponding to the diameter of the label projection 54 (a little larger than this diameter in the exemplifying embodiment of FIG. 3). Additionally, an orienting of the blank, inner, central region of the CD 2 is carried out with reference to this pressure intensifier rib 29. It is thus also guaranteed that the CD will not be struck by the press-cover in the written region. Proceeding for the external ring-shaped pressure intensifier rib 29, pressure intensifier subribs 29' are formed directed radially inward which, as is evident, correspond to an inner measure which approximately corresponds to the free diameter of the CD 2.

In the embodiment of FIG. 7, it is significant that the guiding projection 52 is formed as a hollow body. In further detail, the guiding projection 52 comprises wall sections (52') which extend perpendicularly outward with respect to a longitudinal axis L. In the exemplifying embodiment, the guiding projection 52 further comprises individual segments extending longitudinally. These segments are separated from each other by slit-like openings 53 which likewise extend longitudinally. Obviously, the slits 53 are not continuous, but rather end at the upper and lower side in a still cylindrical region of the wall of the guiding projection 52. Altogether the wall is configured cylindrically.

It is also significant that the cited segments, or respectively, wall sections 52' are curved exteriorly. As the material is designed in an elastically springing fashion, e.g. as a molded plastic part, such a CD 2 can be overpushed, wherein the wall sections 52' move easily interiorly. With a CD pushed on, a snapping hold is thereby achieved, as depicted in FIG. 7. The outer diameter of the guiding projection 52 is correspondingly slightly larger than the inner diameter of the allocated CD 2 opening in this exemplifying embodiment.

Figure 8:
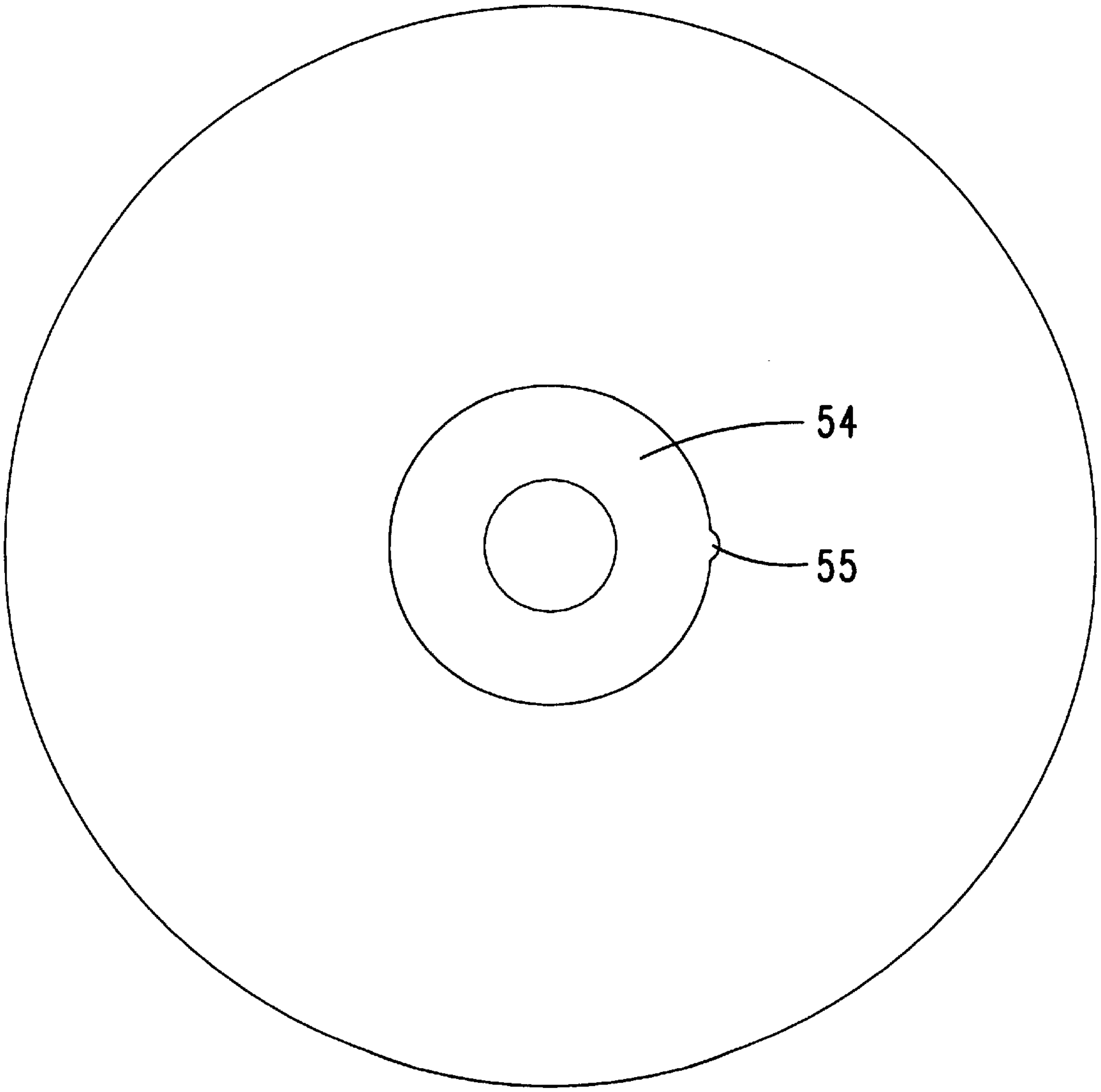
FIG. 8 is a plan view of the device shown in FIG. 7 with press-cover removed.

It is also significant that the label projection 54 comprises a catch or rib 55, as shown in FIG. 8. This is especially significant when the device 1 is driven in combination with a label, as taught by the German utility model 296 19 143.4, for example. The contents of this utility model are incorporated herein by reference in the specification of the present invention, also for the purpose of incorporating features of this utility model in claims of the present application.

It is also evident from the cross-section in FIG. 7 that the label projection 54 externally comprises a penetrating cylindrical wall 56. A through-passage is formed internally at the bottom of the recess 51. A holding shaft 57 that is connected to a footing 58 projects into the recess 51. At its upper side, the holding shaft 57 is provided with a holding part or flange 60 which overruns the diameter of the opening 59 and serves as a stop. By this alone, the label projection 54 is prevented from a further movement upwards based on the force of the spring 61. The spring 61 engages a surface disposed on the underside or lower end **56*a* of the cylindrical body 56**.

Given actuation, a fore-edge 52" of the guiding projection 52 inserts into the central recess 51 up to the projection portion 51'. It is therein also particularly preferred that—with a held CD 2—a free length "a" of the guiding projection 52 is longer than an insertion length "b" of the guiding projection 52 in the central recess 51.

The guiding projection 52 comprises such a free length so that when the guiding projection 52 is inserted in the label projection 54, then a CD 2 which has been accepted onto the guiding projection 52 is held at a distance from a top surface 8. This distance is maintained even in the completion of a labelling process.

Figures 9, 10:
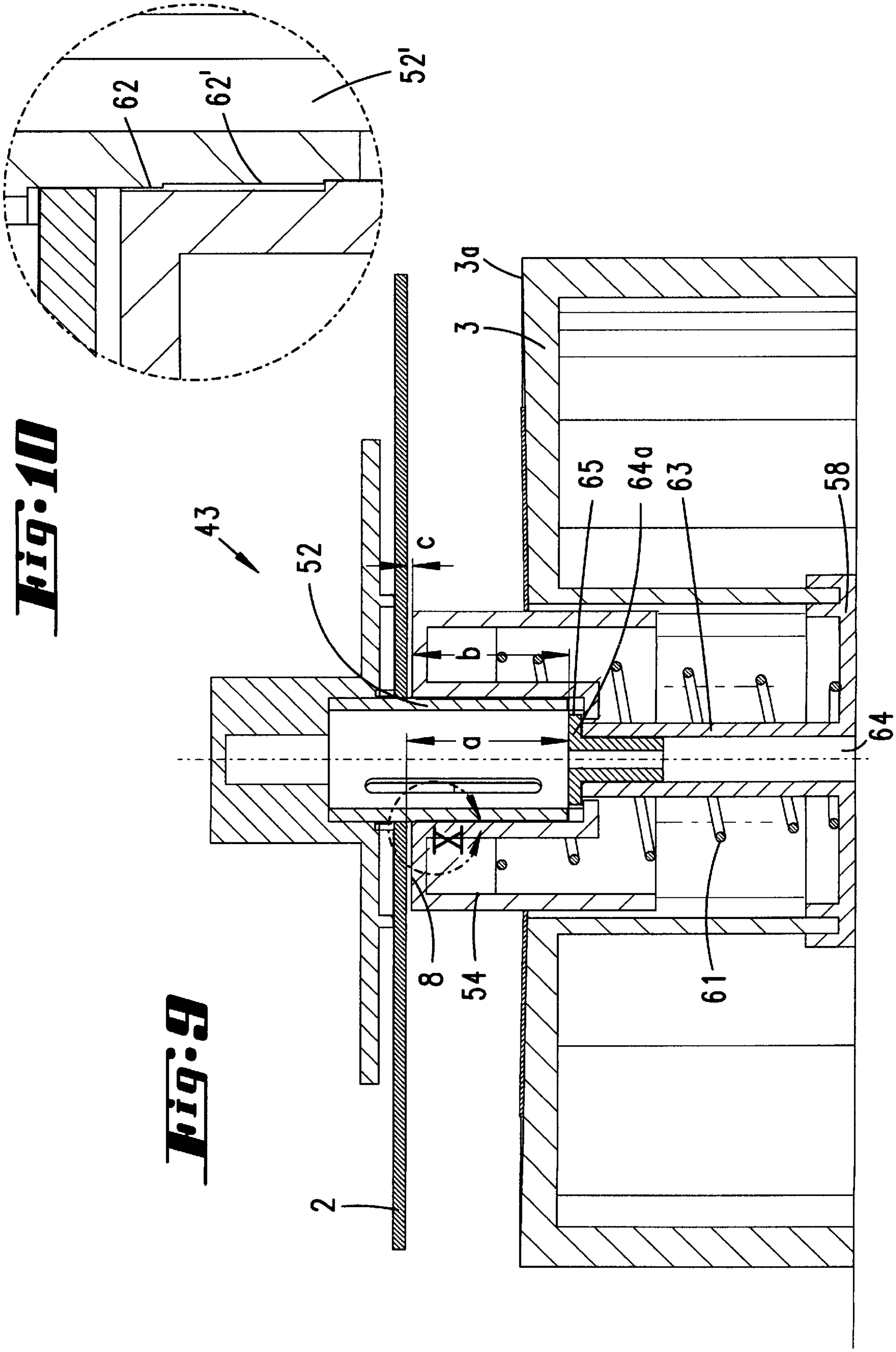
FIG. 9 is a cross sectional view of a further modified embodiment, with an inserted press-cover.
FIG. 10 is a partial enlarged view of the embodiment shown in FIG. 9.

In the embodiment of FIGS. 9 and 10, there are still further alterations relative to the embodiment of FIG. 7. Reference is otherwise made to the description of those embodiments cited previously.

First, it is significant that a wall section 52' comprises a clamping step 62 (see FIG. 10) at its exterior surface. The clamping step 62 is fitted to a free inner diameter of the CD 2. The outer diameter of the clamping step 62 is so large that a clamping hold of the CD 2 results. This results in no or practically no bending interiorly of a wall portion 52'.

In the exemplifying embodiment, an insertion step 62' is provided further underneath the clamping step 62 which must first be overrun in the pushing-on of a CD 2. This does not result in a clamping, however.

As is further evident, the measure "a" is selected larger than the measure "b" in this embodiment as well. Setting the press-cover 43 in the central opening of the label projection 54 results in a "swinging" of the CD 2 beyond the surface 8 of the label projection 54. The distance "c" arising therein between the surface 8 and an underside of the CD 2 is maintained even when the label projection 54 is fully depressed as shown in FIG. 9.

The spring 61 is configured as spiral spring, whereby the windings expand upwards. The winding with the smallest diameter resides at an inner surface of the foot 58. A holding tube 63 is formed centrally at the foot part 58 with an opening 64 in the outer surface of the foot part 58.

A holding stopper **64*a* is driven into the holding tube 63 at the upper side. It is frictionally held in the holding tube 63. As is evident, the holding stopper 64*a* possesses a holding edge 65 projecting beyond the outer diameter of the tube 63, this holding edge 65 securing the holding plate 58 against the label projection 54 and against the action of the spring 61. An outer diameter of the stopper 64 is smaller than an inner diameter of the guiding projection 52**.

It should be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted. It should be understood, of course, that the invention is not necessarily limited to the particular embodiments illustrated herein.

What is claimed:

1. A device for applying a label with a central opening to a compact disk with a smaller central opening, the device comprising:

a base plate comprising an upper surface with a central opening through which a label projection extends, the label projection having a top surface, the label projection being spring biased towards an upper position wherein the top surface is disposed above the upper surface of the base plate, the label projection having a lower position wherein the top surface is disposed at or below a coplanar position with the upper surface of the base plate, the label projection for extending through the central opening of the label when the label projection is in the upper position thereby enabling the label to be placed on the upper surface of the base plate, the label projection further comprising a central recess that extends through the top surface thereof, a press-cover comprising a guiding projection for frictionally engaging the central opening of the compact disk and for extending into the central recess of the label projection, the press-cover for pressing the compact disk onto the top surface of the label projection with the smaller central opening of the compact disk in matching registry with the central recess of the label projection and for pressing the label projection downward from the upper position to the lower position with the compact disk disposed against the top surface thereof so the compact disk engages the label.

2. The device of claim 1 wherein the guiding projection comprises a downwardly directed cylindrical body and the base plate is connected to a tube that extends downward from central opening of the base plate.

3. The device of claim 1 wherein the label projection comprises a cylindrical wall that extends downward from the top surface, the cylindrical wall comprising a longitudinal rib, the base plate being connected to a tube that extends downward from the central opening of the base plate, the tube slidably accommodating the label projection, the tube comprising a longitudinal slot for accommodating the longitudinal rib of the label projection and preventing rotation of the label projection within the tube.

4. The device of claim 1 wherein the label projection further comprises a cylindrical body that extends downward from the top surface thereof, the cylindrical body comprising an underside that engages a spring, the spring being disposed between the underside of the cylindrical body and a footing, the footing being connected to a shaft that extends upward the through an aperture disposed in the underside of the cylindrical body and into the central recess, the shaft comprising a distal end disposed in the central recess, the distal end comprising a radial flange with a diameter, the aperture in the underside of the cylindrical body having a diameter, the diameter of the flange being greater than the diameter of the aperture.

5. The device of claim 4 wherein the cylindrical body comprises a longitudinal rib, the base plate being connected to a tube that extends downward from the central opening of the base plate, the tube slidably accommodating the cylindrical body of the label projection, the tube comprising a longitudinal slot for accommodating the longitudinal rib of the label projection and preventing rotation of the label projection within the tube.

6. The device of claim 4 wherein the footing, shaft and flange are unitary in structure.

7. The device or claim 1 wherein the press cover comprises a cover plate that is connected to the guiding projection, the cover plate being disposed between the guiding projection and a handle.

8. The device of claim 7 wherein the cover plate comprises an underside, the underside of the cover plate comprises at least one downwardly projecting rib for engaging the compact disk and precluding contact between the compact disk and the underside of the cover plate.

9. A device for applying a label with a central opening to a compact disk with a smaller central opening, the device comprising:

a base plate comprising an upper surface with a central opening through which a label projection extends, the label projection having a top surface, the label projection being spring biased towards an upper position wherein the top surface is disposed above the upper surface of the base plate, the label projection having a lower position wherein the top surface is disposed at or below a coplanar position with the upper surface of the base plate, the label projection for extending through the central opening of the label when the label projection is in the upper position thereby enabling the label to be placed on the upper surface of the base plate, the label projection further comprising a central recess that extends through the top surface thereof, a press-cover comprising a guiding projection for frictionally engaging the central opening of the compact disk and for extending into the central recess of the label projection, the press-cover for pressing the compact disk onto the top surface of the label projection with the smaller central opening of the compact disk in matching registry with the central recess of the label projection and for pressing the label projection downward from the upper position to the lower position with the compact disk disposed against the top surface thereof so the compact disk engages the label, the press-cover further comprising a cover plate that is connected to the guiding projection, the cover plate being disposed between the guiding projection and a handle, the cover plate further comprising an underside, the underside of the cover plate comprises at least one downwardly projecting rib for engaging the compact disk and precluding contact between the compact disk and the underside of the cover plate, the label projection further comprising a cylindrical body that extends downward from the top surface thereof, the cylindrical body comprising an underside that engages a spring, the spring being disposed between the underside of the cylindrical body and a footing, the footing being connected to a shaft that extends upward the through an aperture disposed in the underside of the cylindrical body and into the central recess, the shaft comprising a distal end disposed in the central recess, the distal end comprising a radial flange with a diameter, the aperture in the underside of the cylindrical body having a diameter, the diameter of the flange being greater than the diameter of the aperture, the cylindrical body comprising a longitudinal rib, the base plate being connected to a tube that extends downward from the central opening of the base plate, the tube slidably accommodating the cylindrical body of the label projection, the tube comprising a longitudinal slot for accommodating the longitudinal rib of the label projection and preventing rotation of the label projection within the tube.

10. A device for labeling a compact disk comprising:

a base plate for accepting a label having central opening, the base plate comprising a central opening with a free inner diameter, the central opening of the base plate accommodating a label projection which extends upward through the central opening of the base plate and through the central opening of the label, the device further comprising a press-cover for pressing the compact disk having a central opening onto the label, the press-cover comprising a lower side comprising a downward facing guiding projection for engaging the central opening of the compact disk, the label projection further comprising an upper side comprising a central recess for removably receiving the guiding projection of the press-cover.

11. The device of claim 10 wherein the central opening of the compact disk is frictionally engaged by the downward facing guiding projection of the press-cover.

12. The device of claim 10 wherein the guiding projection comprises a cylindrical hollow body.

13. The device of claim 10 wherein the recess of the label projection is connected to a mounting base which extends perpendicularly downward from the label projection, the mounting base comprises an upper end disposed in the recess, the guiding projection comprising a hollow lower end, the upper end of the mounting base matably engaging the hollow lower end of the guiding projection when the press cover is pressed downward to a lowered position.

14. The device of claim 10 wherein the press-cover comprises an upper side comprising a handle.

15. The device of claim 13 wherein the recess of the label projection comprises a bottom with a through opening having a diameter, the upper end of the mounting base passes through the through opening of the bottom of the recess, the upper end of the mounting base being connected to a holding part with the bottom of the recess sandwiched therebetween, the holding part having a diameter which exceeds the diameter of the through opening in the bottom of the recess.

16. The device of claim 10 wherein the label projection in the central opening of the base is biased upward by a spring.

17. The device of claim 15 wherein the label projection is biased upward by a spring and held in an upper position by the holding part engaging the bottom of the recess.

18. The device of claim 10 wherein the guiding projection comprises a plurality of wall sections which can be sprung out perpendicularly along a longitudinal axis of the guiding projection.

19. The device of claim 10 wherein the guiding projection comprises a plurality of longitudinally extending wall segments.

20. The device of claim 10 wherein the guiding projection comprises a plurality of longitudinally extending wall segments that are curved outwardly.

21. The device of claim 10 wherein the label projection comprises an outwardly protruding projection disposed at a perimeter thereof.

22. The device of claim 21 wherein the label projection comprises a longitudinal rib that extends vertically.

23. The device of claim 10 wherein the guiding projection of the press-cover has a free length and the central recess of the label projection has an insertion length that is shorter than the free length of the guiding projection.

24. The device of claim 10 wherein the press-cover comprises a cover plate, the cover plate comprising a radially extending slot with a press hold projection disposed therein, the press hold projection comprising a distal end comprising a downwardly extending tab, the press hold projection being movable from a radially outward position to a radially inward position where the tab engages an outer periphery of the compact disk to secure the compact disk in place under the cover plate.

25. The device of claim 10 wherein the press-cover comprises a cover plate having an underside which is connected to the guiding projection and an upper side which is connected to an upwardly protruding actuation projection.

26. The device of claim 25 wherein the actuation projection comprises a handle.

27. The device of 25 wherein the guiding projection and the actuation projection and the cover plate are integrally connected.

28. A device for applying a label with a central opening to a compact disk with a central opening, the device comprising:

a base plate comprising a central opening through which a label projection extends, the label projection having a top surface, the label projection being biased towards an upper position wherein the top surface is disposed above the base plate, the label projection having a lower position wherein the top surface is disposed at or below a coplanar position with the base plate, the label projection extending through the central opening of the label when the label projection is in the upper position thereby enabling the label to be placed on the base plate, and a press-cover being fixedly attached to a guiding projection, the guiding projection frictionally engaging the central opening of the compact disk, the press-cover for pressing the compact disk and the label projection downward from the upper position so the compact disk engages the label.

29. The device of claim 28 wherein the guiding projection comprises a downwardly directed cylindrical body.

30. The device of claim 28 wherein the guiding projection has a central axis directed downward from the press-cover, the guiding projection further comprises a plurality of wall sections which extend outwardly from a central axis.

31. The device of claim 28 wherein the guiding projection comprises a plurality of individual wall segments that extend downward from the press-cover.

32. The device of claim 31 wherein the wall segments of the guiding projection are curved in an outward direction.

33. The device of claim 28 wherein the label projection comprises a cylindrical wall that extends downward from the top surface, the cylindrical wall comprising a protruding member, the base plate being connected to a tube that extends downward from the central opening of the base plate, the tube accommodating the label projection, the tube comprising a recess for accommodating the protruding member of the label projection.

34. The device of claim 28 wherein the press-cover comprises a cover plate, the cover plate comprising a radially extending slot with a press hold projection disposed therein, the press hold projection comprising a distal end comprising a downwardly extending tab, the press hold projection being movable from a radially outward position to a radially inward position where the tab engages an outer periphery of the compact disk to secure the compact disk in place under the cover plate.

35. The device of claim 34 wherein the press hold projection is connected to an upwardly protruding actuation projection disposed at a center of the cover plate.

36. The device of claim 35 wherein the actuation projection comprises a handle.

37. The device of claim 28 wherein the label projection further comprises a cylindrical body that extends downward from the top surface thereof, the cylindrical body further comprising an underside that engages a spring, the spring being disposed between the underside of the cylindrical body and a footing, the footing being connected to a shaft that extends upward through an aperture disposed in the underside of the cylindrical body and into the central recess, the shaft comprising a distal end disposed in the central recess, the distal end comprising a radial flange with a diameter, the aperture in the underside of the cylindrical body having a diameter, the diameter of the flange being greater than the diameter of the aperture.

38. The device of claim 28 wherein said press-cover is for pressing the compact disk onto the top surface of the label projection and for pressing the label projection downward from the upper position to the lower position with the compact disk disposed against the top surface thereof so the compact disk engages the label.

39. The device of claim 28 wherein the press-cover comprises a cover plate disposed above the guiding projection, said cover plate comprising an underside which comprises at least one pressure intensifier ribs for limiting the contact between the compact disk and the press cover.

40. The device of claim 39 wherein said rib is ring-shaped and is spaced radially outward from a center axis of the press-cover.

41. The device of claim 40 wherein said radius corresponds generally to an outer diameter of the label projection.

42. The device of claim 39 wherein said pressure intensifier rib is directed radially outward from a center axis of the press-cover.

43. The device of claim 28 wherein between said upper position and said lower position of the label projection, the guiding projection and the label projection are aligned coaxially with respect to their respective central axis.

44. The device of claim 28 wherein the label projection comprises a central recess, said central recess being matably engaged by the guiding projection between said upper position and said lower position of the label projection.

* * * * *